US 9,591,347 B2

(12) United States Patent
Morse et al.

(10) Patent No.: US 9,591,347 B2
(45) Date of Patent: Mar. 7, 2017

(54) DISPLAYING SIMULATED MEDIA CONTENT ITEM ENHANCEMENTS ON MOBILE DEVICES

(71) Applicant: Google Inc., Mountain View, CA (US)

(72) Inventors: Reed Morse, Palo Alto, CA (US); Christopher Peter Rhodes, San Francisco, CA (US); John Gregg, San Francisco, CA (US); Damien Kelly, Sunnyvale, CA (US); Rushabh Ashok Doshi, Menlo Park, CA (US); Jason Toff, San Francisco, CA (US); Molly Castle Nix, San Francisco, CA (US); Joshua Abraham Tabak, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 186 days.

(21) Appl. No.: 13/842,533

(22) Filed: Mar. 15, 2013

(65) Prior Publication Data
US 2014/0123041 A1 May 1, 2014

Related U.S. Application Data

(60) Provisional application No. 61/720,929, filed on Oct. 31, 2012.

(51) Int. Cl.
*G06T 5/50* (2006.01)
*G11B 27/30* (2006.01)
(Continued)

(52) U.S. Cl.
CPC ......... *H04N 21/41407* (2013.01); *G06T 5/50* (2013.01); *G11B 27/031* (2013.01);
(Continued)

(58) Field of Classification Search
CPC ....... G11B 27/031; G11B 27/105; G06T 5/50; G06F 3/0484; H04N 21/4622; H04N 21/854
(Continued)

(56) References Cited

U.S. PATENT DOCUMENTS 5,682,326 A 10/1997 Klingler et al.
6,043,845 A * 3/2000 Thompson ............... G06F 3/14
348/502
(Continued)

FOREIGN PATENT DOCUMENTS

WO 0146955 A2 6/2001

OTHER PUBLICATIONS

International Searching Authority, "Notification of Transmittal of the International Search Report and the Written Opinion of the International Search Authority, or the Declaration," for International Application No. PCT/US2013/066435, mailed Apr. 29, 2014, 9 pages.
(Continued)

*Primary Examiner* — William Bashore
*Assistant Examiner* — Daniel Parcher
(74) *Attorney, Agent, or Firm* — Lowenstein Sandler LLP

(57) ABSTRACT

Systems and methods for displaying a simplified version of a modification of a media content item on a mobile device are provided. The mobile device can receive, via a user interface presented on the mobile device, a request for a desired modification of an original media content item. The mobile device can perform a simplified version of the desired modification of the original media content item. The mobile device can present a preview of the modified media content item in the user interface. The mobile device can transmit, to another computing device, the original media content item with the request for the desired modification.

20 Claims, 5 Drawing Sheets

(51) Int. Cl.
*G11B 27/031* (2006.01)
*H04N 21/414* (2011.01)
*G11B 27/10* (2006.01)
*H04N 21/462* (2011.01)
*H04N 21/854* (2011.01)
*G06F 3/0484* (2013.01)

(52) U.S. Cl.
CPC ....... *G11B 27/105* (2013.01); *H04N 21/4622* (2013.01); *H04N 21/854* (2013.01); *G06F 3/0484* (2013.01)

(58) Field of Classification Search
USPC ........................................................ 715/722
See application file for complete search history.

(56) References Cited

U.S. PATENT DOCUMENTS

| | | | |
|---|---|---|---|
| 8,768,142 B1* | 7/2014 | Ju et al. ................ | 386/224 |
| 2006/0263038 A1 | 11/2006 | Gilley | |
| 2008/0069458 A1* | 3/2008 | Vega-Higuera ......... | G06T 15/08 382/232 |
| 2008/0304562 A1* | 12/2008 | Chang .................. | H04N 19/159 375/240.03 |
| 2009/0070675 A1* | 3/2009 | Li .......................... | G06Q 20/12 715/716 |
| 2009/0100050 A1* | 4/2009 | Erol .................. | G06F 17/30026 |
| 2010/0295805 A1 | 11/2010 | Shin et al. | |
| 2010/0312833 A1* | 12/2010 | Rimmer ............. | G08B 21/0415 709/204 |
| 2011/0161076 A1 | 6/2011 | Davis et al. | |
| 2011/0311199 A1 | 12/2011 | Fay | |
| 2012/0001934 A1 | 1/2012 | Bala et al. | |
| 2012/0190388 A1 | 7/2012 | Castleman et al. | |
| 2012/0215539 A1* | 8/2012 | Juneja ..................... | G10L 15/30 704/254 |
| 2012/0246114 A1* | 9/2012 | Edmiston et al. ............ | 707/625 |
| 2013/0002674 A1* | 1/2013 | Lea .......................... | G09G 5/00 345/428 |
| 2013/0286280 A1* | 10/2013 | Siann ................... | H04N 5/2252 348/372 |
| 2014/0071045 A1* | 3/2014 | Muchnick ............... | G06T 11/60 345/156 |

OTHER PUBLICATIONS

European Patent Office, "Supplementary European Search Report" for European Application No. 13850671.2, mailed May 6, 2016, 10 pages.

* cited by examiner

DISPLAYING SIMULATED MEDIA CONTENT ITEM ENHANCEMENTS ON MOBILE DEVICES

RELATED APPLICATION

This application claims priority to U.S. Provisional Patent Application No. 61/720,929, filed Oct. 31, 2012, which is herein incorporated by reference.

TECHNICAL FIELD

Implementations of the present disclosure relate to a media content item editing system, and more specifically, to simulating a media content item enhancement on a mobile device.

BACKGROUND

Many people record video on their mobile devices and share those videos with others. In many cases, these videos could benefit from modifications that alter the appearance of the video or improve visual and aural qualities of the video. Editing video content, however, can require considerable computing power and current technologies do not allow for meaningful video enhancements to be performed on mobile devices. Therefore, many videos are uploaded from mobile devices to a content hosting service without any enhancements.

SUMMARY

In some implementations, a computer-implemented method to present simulations of enhanced media content items on mobile devices is presented. The method includes receiving, via a user interface presented on a mobile device, a request for a desired modification of an original media content item. The method further includes performing, at the mobile device, a simplified version of the desired modification of the original media content item. The method also includes presenting a preview of a modified media content item in the user interface. The method also includes transmitting, to another computing device, the original media content item with the request for the desired modification.

In another implementation, the method includes performing the simplified version of the desired modification of the media content item at substantially the same time as the receipt of the request for the desired modification via the user interface.

In yet another implementation, the method includes receiving, via the user interface, a confirmation of the request for the desired modification of the original media content item.

In a further implementation, the method includes receiving the media content item with the desired modification from the another computing device and display the media content item with the desired modification in the user interface.

In some implementations, an apparatus includes means for receiving, via a user interface presented on a mobile device, a request for a desired modification of an original media content item. The apparatus also includes means for performing, at the mobile device, a simplified version of the desired modification of the original media content item. The apparatus further includes means for presenting a preview of a modified media content item in the user interface. The apparatus also includes means for transmitting, to another computing device, the original media content item with the request for the desired modification.

In another implementation, the apparatus includes means for receiving, via the user interface, a confirmation of the request for the desired modification of the original media content item.

In other implementations, an apparatus includes means for performing the simplified version of the desired modification of the media content item at substantially the same time as the receipt of the request for the desired modification via the user interface.

In another implementation, an apparatus includes means for receiving the media content item with the desired modification from the another computing device and means for displaying the media content item with the desired modification in the user interface.

In additional implementations, computing devices for performing the operations described above are also implemented. Further, in some implementations, a computer readable storage medium is provided to store instructions causing a processing device to perform the operations described above.

For illustrative purposes, the description below is applicable to video, but the systems, apparatuses and methods described herein can similarly be applicable to any type of media content item, including audio, images, video, or any combination thereof.

BRIEF DESCRIPTION OF THE DRAWINGS

The present disclosure is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Figure 1:
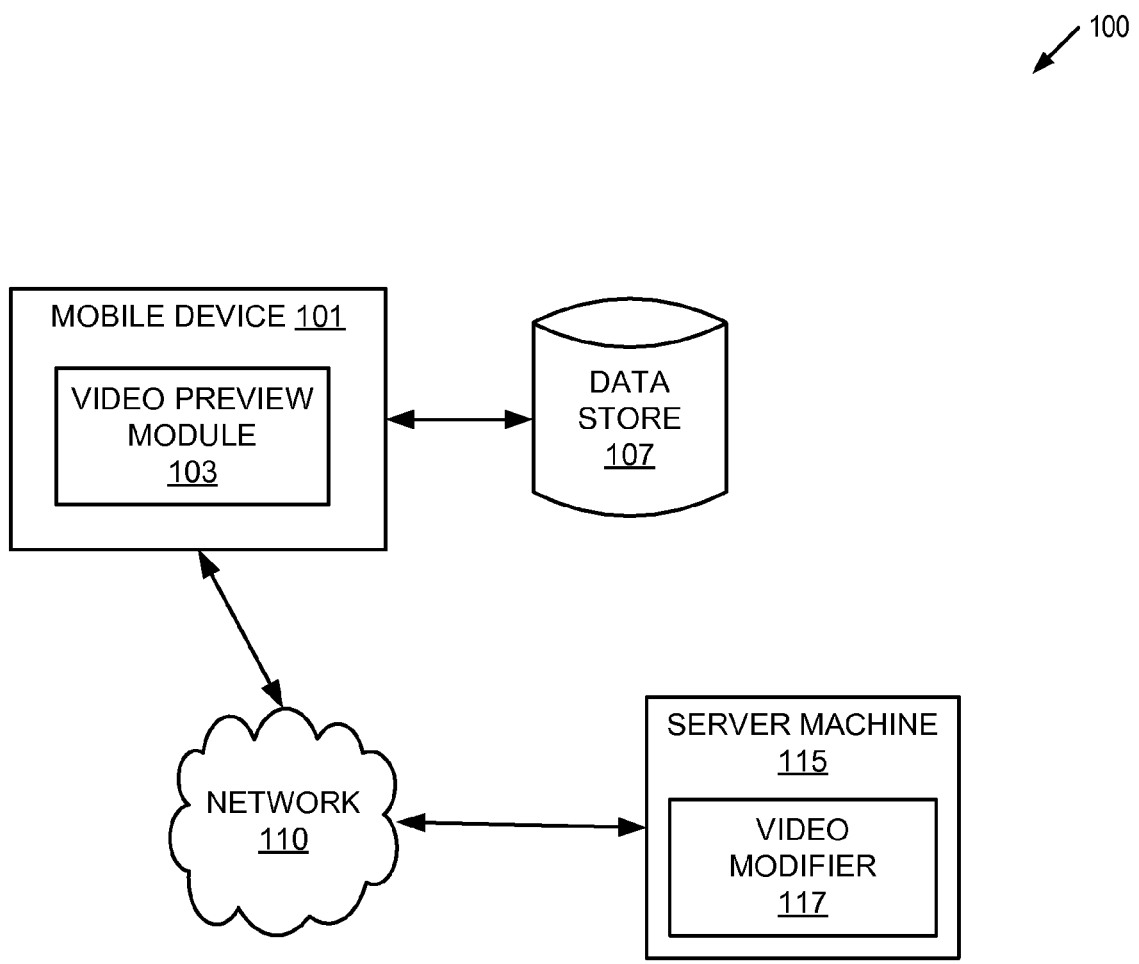
FIG. 1 is a block diagram that illustrates an example system architecture in which implementations of the present disclosure may be implemented.

Described herein is a mechanism for presenting simulations of enhanced videos on mobile devices. Conventionally, stationary computers perform video editing because they can have increased computing resources when compared to mobile devices. Such stationary computers can include desktop computers and servers. Users typically capture videos using mobile devices because they are more portable than stationary computers. Once users capture videos on their mobile devices, they transfer the captured videos from their mobile devices to stationary computers where the videos can then be viewed, edited and shared.

Some mobile devices can perform very basic video editing, but usually mobile devices have limited capabilities for enhancement. For instance, video stabilization modifications tend to yield better results when utilizing more powerful machines and processors that are not available on mobile devices. Even for mobile devices that may have sufficient computing resources to perform video enhancements, video edits typically consume computing resources and battery life at a high rate, thereby negatively impacting the performance and usability of the mobile devices. When video enhancements are performed over a network (e.g., on a cloud), a preview of the enhanced video on the mobile device is delayed due to time required for uploading the video to the cloud, waiting for the cloud to complete the enhancement operations, and downloading the modified video to the mobile device so it could be viewed as a preview before the user decides whether to keep the modification.

Implementations of the present disclosure address the above deficiencies of conventional systems by performing simplified enhancements of a video on a mobile device and presenting a preview of the resulting enhanced video on the mobile device. For example, a mobile device can receive a request for a desired enhancement of an original video. The mobile device can perform a simplified version of the desired enhancement of the original video, and present a preview of the resulting enhanced video in a user interface. The mobile device can then transmit, to a server, the video with the request for the desired enhancement.

Performing a simplified video enhancement can require less computing resources than performing a complete (non-simplified) video enhancement. For example, complete video enhancement can be a frame-by-frame color correction that includes applying filters over multiple passes, and simplified video enhancement can be a simple color over-saturation. The mobile device can modify the video using the simplified video enhancement almost immediately after receiving the request for the desired enhancement. Accordingly, the present disclosure provides an efficient and convenient mechanism that allows users to quickly see a simplified enhancement of a video and decide whether a complete enhancement of the video is desirable. In particular, implementations of the present disclosure enable users to quickly preview simplified enhancements to videos on their mobile devices while letting a more powerful machine perform the complete enhancements. This allows a user to take advantage of the ease of use and portability of a mobile device for requesting a desired enhancement without negatively impacting performance of the mobile device.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

The term "video" is used herein for illustrative purposes only, and the present disclosure can also be applied to any type of media content item, such as audio, images, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, or other media content.

FIG. 1 illustrates example system architecture 100 in which implementations can operate. The system architecture 100 can include any number of mobile devices 101, one or more server machines 115, and one or more data stores 107 coupled to each other over a network 110. Network 110 may be a public network (e.g., the Internet), a private network (e.g., a local area network (LAN) or wide area network (WAN)), or a combination thereof.

The mobile device 101 can be a portable computing device, such as, and not limited to, cellular telephones, personal digital assistants (PDAs), portable media players, netbooks, laptop computers, an electronic book reader or a tablet computer (e.g., that includes a book reader application), and the like. The mobile device 101 can receive a media item, such as a digital video or a digital movie from the data store 107. The mobile device 101 can run an operating system (OS) that manages hardware and software of the mobile device 101.

The data store 107 can store media items, such as, and not limited to, digital video, digital movies, etc. Media items can be received from any source, including components of the mobile device 101, a server machine 115, another mobile device 101, etc. For example, the data store can store a digital video captured by a video camera of a mobile device 101. The data store 107 can be a persistent storage that is capable of storing data. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items. The data store 107 can be internal to the mobile device 101 or external to the mobile device 101 and accessible by the mobile device 101 via a network. As will be appreciated by those skilled in the art, in some implementations data store 107 may be a network-attached file server or a cloud-based file server, while in other implementations data store 107 might be some other type of persistent storage such as an object-oriented database, a relational database, and so forth.

Server machine 115 can be a rack mount server, a router computer, a personal computer, a portable digital assistant, a laptop computer, a desktop computer, a media center, a tablet, a stationary machine, or any other computing device capable of performing enhancements of videos.

In one implementation, the mobile device 101 uses a video preview module 103 to perform a simplified version of a desired video modification and present a preview of the resulting video. An example video preview module 103 is discussed in more detail below in conjunction with FIG. 2. The video preview module 103 can receive a request for a desired modification to a video stored in data store 107. To reduce computing resources associated with video editing, the video preview module 103 can perform a simplified version of the desired modification on the video and can present the resulting video to a user in a user interface. The mobile device 101 can transmit the video to server machine 115. At any time before, during or after transmitting the video to server machine 115, the mobile device can transmit the request for the desired modification of the video. Once the video transmission finishes, the server machine 115 can perform the modification to the video.

In one implementation, the user can view the resulting video to decide whether to proceed with the complete (non-simplified) modification of the video and can submit a confirmation of the request for the desired modification. In this implementation, once the video preview module 103 receives the confirmation, the mobile device 101 can transmit the video to server machine 115, along with the request for the desired modification of the video.

The server machine 115 can receive the video and the request for the desired modification of the video. Server machine 115 can include video modifier 117 to perform the desired modification of the video that the user requested via the mobile device 101. Server machine 115 can include a content hosting service, for example, that can process or generate the modification of the video. Once the modification of the video is complete, server machine 115 can make the modified video available for viewing by others (e.g., on the content hosting service's website). Alternatively, the mobile device 101 can upload the video to a personal computer, laptop or other "non-cloud device" for performing the modification. Once the modification is performed, these devices can publish the video such that it is viewable at least to the mobile device via a wired or wireless protocol, such as a local network, Bluetooth™, Wi-Fi, the internet, etc.

In an example, a user desires to enhance the color of a leopard in a video. The mobile device 101 can execute an algorithm to perform a simplified version of a color enhancement to the leopard, which can be a simple over-saturation filter that changes the colors of the video. Conversely, to perform the complete modification, the server machine 115 can use a much more detailed and complex algorithm to alter the colors of the leopard video. The server machine 117 can also use reference videos to identify the best color match for the leopard. The server machine 117, for example, can use a video hosting service to identify one or more reference videos of leopards and determine color characteristics of the leopards in the reference videos. To enhance the video, the server machine 117 can match the color of the leopard in the video with those in the reference videos.

The desired modification can be any alteration or enhancement to the video. The desired modification, for example, can be an operation intended to augment, alter, or modify the objective quality or subjective artistic value of the video. Any number of modifications can be available to a user. A modification can include filters that modify the appearance of the video. Filters can adjust or augment colors, saturation, contrast, brightness, tint, focus, and exposure and can also add effects such as framed borders, color overlay, blur, sepia, lens flares, etc. Other modifications can be spatial transformations, such as cropping or rotation that can alter a spatial property of the video, such as size, aspect ratio, height, width, rotation, angle, etc. Other modifications can be simulations of photographic processing techniques (e.g., cross process, High Dynamic Range (HDR), HDR-ish), simulation of particular cameras models (e.g., lomo, holga), or the styles of particular photographers/cinematographers (e.g., Orton, orton-ish). Examples of static modifications may include cross process, cinemascope, adding audio and a mix level for the audio, erasure of specific audio (e.g., removing a song from the video recording), or addition of sound effects, etc. Examples of dynamic modifications can include identifying filters and randomizing inputs (e.g. intensity of effect) over course of the video, filters using inferred depth map info (e.g., foreground color with background black & white, foreground in focus with background blur), speed up, slow down, tilt-shift simulation, adding a frame outside the video (e.g., video inside an old TV with moving dials), superimposing things on top of video (e.g. Ryan Gosling, James Van Der Beek), overlaying items on people's faces (e.g. hats, mustaches, etc) that can move with the people in the video, selective focus, miniature faking, tilted focus, adjusting for rotation, 2D to 3D conversion, etc. Other examples include modifications where the user provides little or no input other than clicking an "I'm feeling lucky," "Magic enhancement" or "Magic adjustment" button.

In some implementations, the video preview module 103 can automatically perform a simplified version of the modification of the video. Once the user designates a desired modification in the user interface as being an automatic modification, video preview module 103 can automatically modify the video with no further action from the user. An automatic modification requires no additional input, settings or manual adjustment from the user. For example, the user can select a sepia tone filter as an automatic modification. Each subsequent video received by the mobile device 101 can have the sepia filter applied automatically.

In some implementations, the user can preview a video modified using a simplified modification algorithm, and may request that all subsequent videos be modified using a corresponding regular (non-simplified) modification algorithm. In those implementations, the above modification is designated as automatic, and all subsequent videos are automatically sent to the server with a request to perform the above modification. Alternatively, a simplified version of the above modification algorithm can be performed on each subsequent video and a preview of the resulting modified video can be presented to the user. The user can then request an additional modification, which can be performed using a simplified algorithm and provided as a preview or it can be sent to the server to be performed remotely. One example of such additional modification can be a trim operation that the user can request using a "trim" menu providing the user with an option to trim the size, aspect ratio, duration, etc. of the video.

In one implementation, mobile device 101 includes a video capture module (not shown) that can record, obtain, import, or otherwise capture video. The video capture module can be, for example, an image sensor, camera, video camera, or a combination thereof. Videos captured by video capture module can be modified, as described herein.

Figure 2:
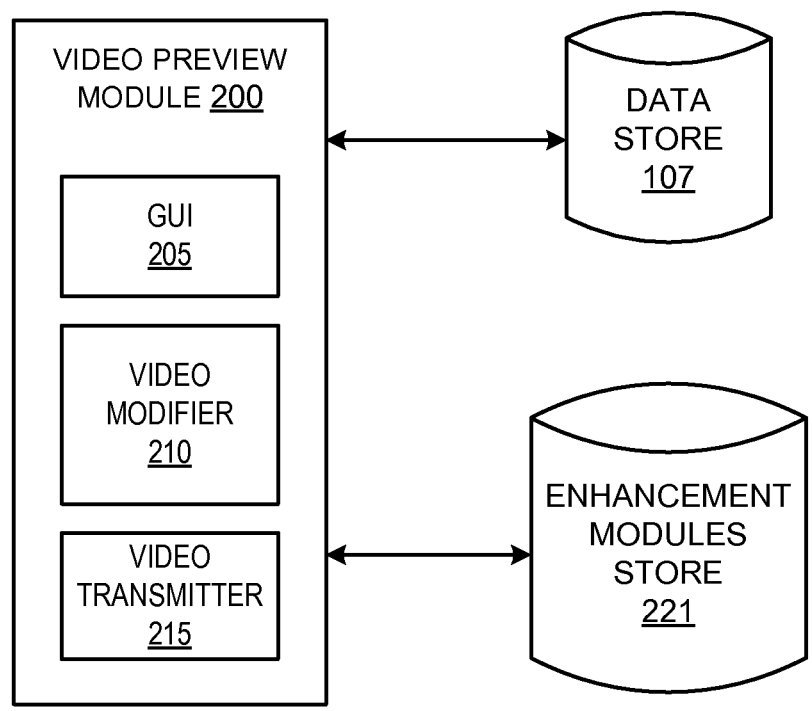
FIG. 2 is a block diagram illustrating one implementation of a video preview module.

FIG. 2 is a block diagram of a video preview module 200, in accordance with one implementation of the present disclosure. The video preview module 200 can include a graphical user interface (GUI) 205, a video modifier 210, and a video transmitter 215. In alternative implementations, the functionality of one or more of the GUI 205, a video modifier 210, and a video transmitter 215 may be combined or divided into additional components.

The video preview module 200 can be coupled to one or more data stores 107 that store online media items. Data store 107 can receive a media item from another module or component of the mobile device 101, such as from a video capture module or from a camera. In another implementation, data store 107 receives a media item from another mobile device 101 or from a remote storage, such as from a media hosting server.

The video preview module 200 can also be coupled to an enhancement module store 221 that can include algorithms for performing one or more simplified modifications to a video. Data store 107 and enhancement module store 221 can be persistent storage units, as described herein.

GUI 205 can be a user interface allowing a user to interact with a mobile device 101. GUI 205 can include one or more user interface tools. As the term is used herein, a user interface tool refers to any single graphical instrument or combination of graphics controls that permit a user to input information to a computer system. Common conventional user interface tools include visual output for one or more buttons, text boxes, scroll bars, pictures, spin dials, list boxes, search boxes, select options, etc.

GUI 205 can present videos to a user and can receive input from the user. Through GUI 205, video preview module 200 can receive a request for a desired modification of a video from the user. For example, the GUI 205 can present an option or menu for selecting a desired modification of the video. Using the option or menu, the user can request a desired modification of the video. The desired modification can include one or more enhancements to the video, such as color correction, stabilization, trim, and others as described herein.

In addition to providing interface tools, GUI 205 can also be configured to present a preview of the modified video that has been generated by the video modifier 210. By viewing the modified video, the user can decide whether to confirm the request for the desired modification of the video. GUI 205 can also be configured to receive a confirmation of the request for the desired modification of the video and can forward the confirmation to the video transmitter 215. Examples of other data that can be presented by GUI 205 are described in further detail in conjunction with FIGS. 3A and 3B.

The video modifier 210 can use the request for the desired modification of the video to perform a simplified version of the modification of the video. The video modifier 210 can modify the video according to a simplified algorithm. The simplified algorithm can be optimized for mobile devices, such that executing the simplified algorithm consumes minimal resources (e.g. computing power, battery life, memory, etc.) of the mobile device. By performing the simplified algorithm, the video modifier 210 can generate an approximation of how the complete modification may alter or change the appearance of the video. For example, a complete modification can adjust the brightness of a video. To use less computing resources, a simplified modification can include adjusting portions of the video that are most likely to show a change in brightness. With the simplified modification, black portions of the video might not be modified because they can be less likely to show the change in brightness than in other colors.

In one implementation, the video modifier 210 can perform the simplified version of the desired modification of the video almost immediately after the GUI 205 receives the request. In this manner, the GUI 205 can present a preview of the resulting modified video to the user in real time. Similarly, GUI 205 can begin playing the modified video and can receive one or more requests for a desired modification from the user at substantially the same time. This enables a user to quickly preview different modifications to the video and decide which of these modifications are likely to produce the result desired by the user.

The video transmitter 215 can transmit the video to another device, such as a server, with the request for the desired modification. For example, when the user activates an "Upload" GUI button on the GUI 205, video transmitter 215 can transmit the video to a server or system of distributed servers (e.g. the "cloud"), or a content hosting service. The video transmitter 215 can also upload the video to a personal computer, a laptop, or other device with computing power sufficient to perform the actual video enhancement.

In one implementation, in order to expedite the complete modification of the video in anticipation of the user's conformation of the original modification request, the mobile device 101 can start uploading the video to the server in parallel with, or prior to, presenting the preview of the video modified with a simplified algorithm. For example, the video can be uploaded 99%, and the final 1% can be uploaded when the GUI 205 receives the user's conformation of the original modification request, such as through an "upload" button. This enables a better user experience because the user waits less time for the video to upload and for the complete modification to process.

Figure 3A:
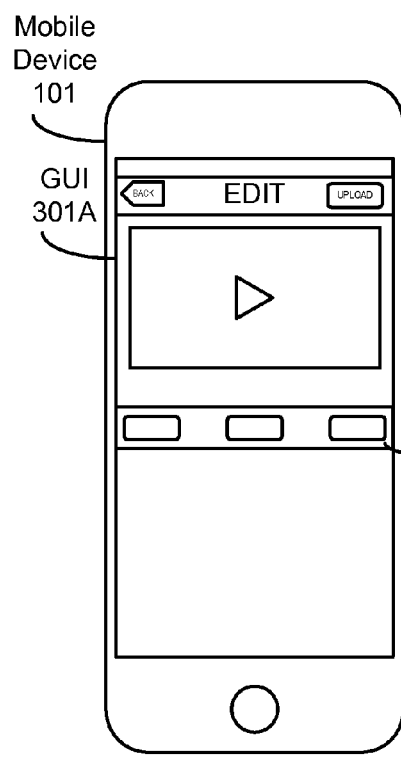
FIGS. 3A-3B illustrate sample graphical user interfaces for handling a video on a mobile device.
Figure 3B:
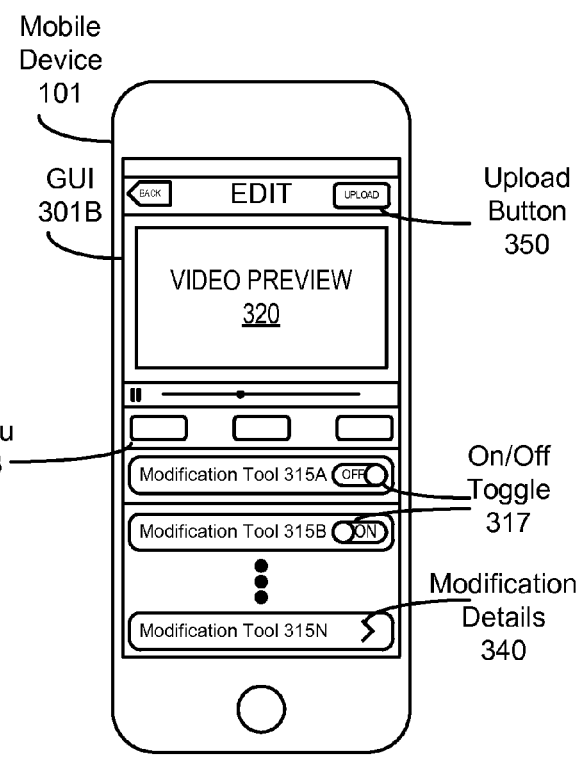

FIGS. 3A and 3B illustrate example GUIs 301 on mobile device 101 in accordance with implementations. The example GUIs 301 can be GUI 205 of FIG. 2. Using GUI 301, the user can play the video, set privacy settings, share the video via email, text, social network, and the like. The user can use GUI tools to provide input and to navigate to different pages. GUI 301 can include menu 303, modification tool 315, on/off toggle 317, modification details 340, and upload button 350.

FIG. 3A illustrates a GUI 301A for managing videos using mobile device 101. GUI 301A can have a menu 303 that receives input to navigate to various screens. The menu 303 can direct a user to a video characteristics screen that permits the user to associate various characteristics with the video (e.g., title, location of video, publicly or privately listed on an online video service, etc.). The menu 303 can also be used to navigate to a page or to open a window that enables the user to share videos with others (e.g., via a social network site). The menu 303 can also be used to navigate to a page or open a window that enables the user to provide input pertaining to video modifications, as described herein.

FIG. 3B, illustrates a GUI 301B for receiving a request for one or more desired modifications of a video. GUI 301B can provide one or more modification tools 315A-N that enable a user to select a modification or enhancement to the video. The types of modifications can be myriad, examples of which are described in conjunction with FIG. 1. GUI 301B can display an On/Off Toggle 317 that can be configured to select or deselect a modification tool 315. In one implementation, a modification can have multiple variations with one or more selectable settings. In this implementation, a user can activate the modification details tool 340 to navigate to another GUI (not shown) that enables the user to adjust the one or more selectable settings to produce the multiple variations.

Video preview area 320 can present a preview of the resulting video modified using a simplified enhancement algorithm. The preview can be in any format and in any aspect ratio. If the user is satisfied with the modifications to the video, the user can provide a confirmation of the request for the desired modification of the video, such as via upload button 350.

Figure 4:
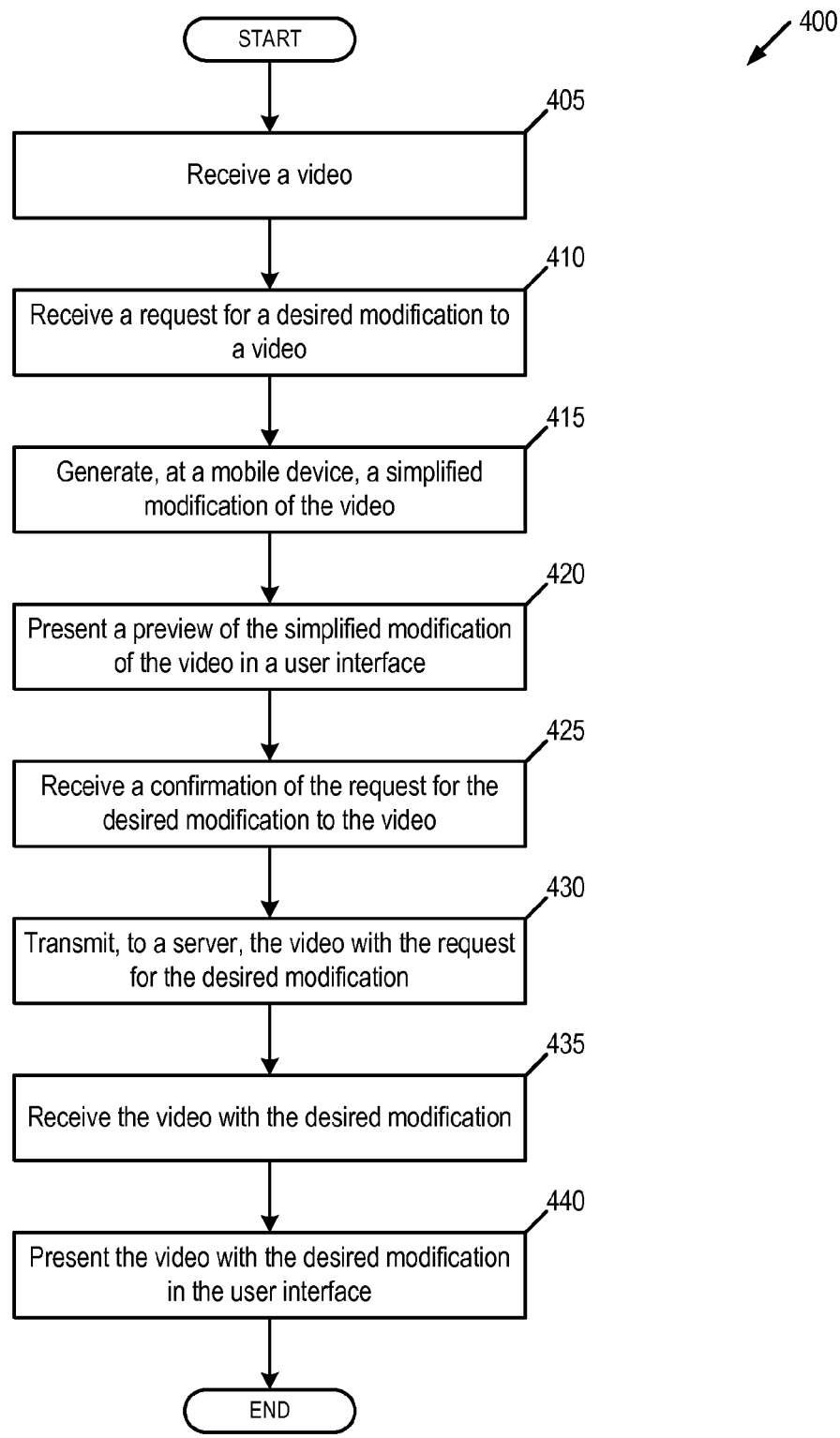
FIG. 4 is a flow diagram illustrating an implementation of a method for video preview functions that can be performed by a mobile device.

FIG. 4 is a flow diagram illustrating an implementation of a method 400 for modifying video. Method 400 can be performed by processing logic (e.g., in computing system 500 of FIG. 5) that may comprise hardware (e.g., circuitry, dedicated logic, programmable logic, microcode, etc.), software (such as instructions run on a processing device), firmware, or a combination thereof. In one implementation, method 400 is performed primarily by video preview module 200 of FIG. 2.

At block 405 of method 400, processing logic receives a video. Processing logic can receive the video from any source or device, and via any network. At block 410, processing logic receives, via a user interface presented on a mobile device, a request for a desired modification of a video. The modification can be any change to the visual or audio features of the video, as described herein. Using the modification request, at block 415 processing logic performs, at the mobile device, a simplified version of the desired modification of the video. At block 420, processing logic presents the modified video in the user interface. At block 425, processing logic can receive, via the user interface, a confirmation of the request for the desired modification of the video. Processing logic can transmit, to a server, the video with the request for the desired modification at block 430. In one implementation, processing logic transmits the video with the request for the desired modification to the server in response to the confirmation.

In another implementation, processing logic can receive the video with the desired modification at block 435. The desired modification can have been performed by another device or system. Processing logic can present the video with the desired modification in the user interface. For example, a user can record a video on a mobile device, select one or more enhancements to the video and upload the video to a video sharing website. Servers at the video sharing website can perform the enhancements and can store the modified or enhanced video. Once processing logic receives the video with the desired modification, it can present the modified video in the user interface.

Figure 5:
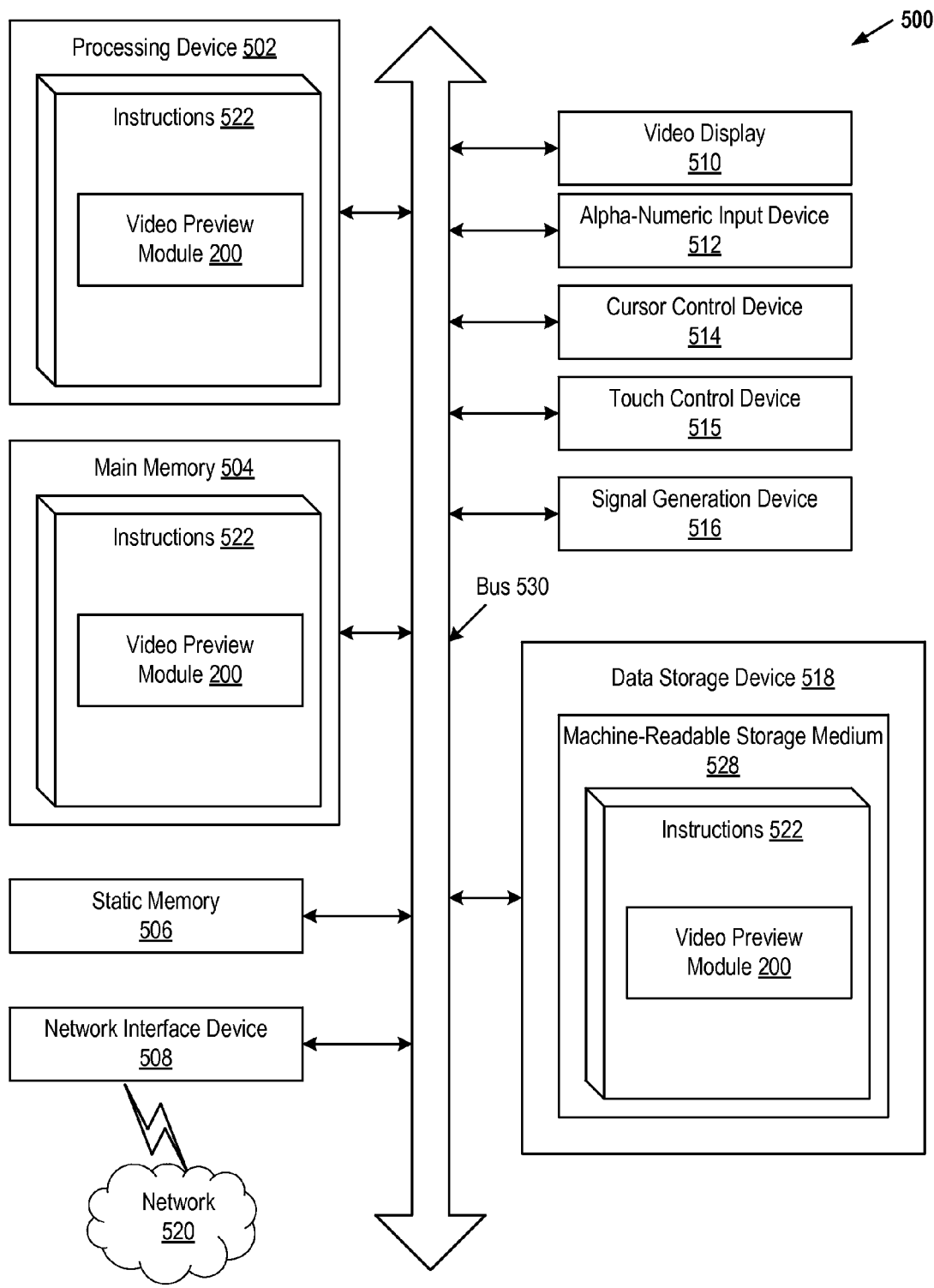
FIG. 5 illustrates an example computer system that facilitates the presentation of simulated video enhancements on mobile devices.

FIG. 5 illustrates a diagrammatic representation of a machine in the exemplary form of a computing system 500 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 can be configured to execute the video preview module 103 for performing the operations and steps discussed herein.

Computing system 500 may further include a network interface device 508. Computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a touch control device 515 (e.g., a touch sensitive device that can receive simple or multi-touch gestures) and a signal generation device 516 (e.g., a speaker).

Additionally, the machine may include an image sensing module, an image capture device, a hardware media encoder/decoder and/or a graphics processor (GPU). The image sensing module can include an image sensor. An image sensor is a device that converts an optical image or images into an electronic signal. The image sensor can be a camera, CMOS, CCD. The image sensor can capture still images or motion pictures (video).

Data storage device 518 may include a machine-readable storage medium (or more specifically a computer-readable storage medium) 520 having one or more sets of instructions (e.g., video preview module 103) embodying any one or more of the methodologies of functions described herein. The video preview module 103 may also reside, completely or at least partially, within main memory 504 and/or within processing device 502 during execution thereof by computing system 500; main memory 504 and processing device 502 also constituting machine-readable storage media.

Machine-readable storage medium 520 may also be used to store the device queue manager logic persistently. While machine-readable storage medium 520 is shown in an exemplary implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "capturing", "performing", "causing", "encoding", "storing," "receiving," "assigning," "generating," "presenting," "transmitting," "obtaining," "displaying," or the like, may refer to the actions and processes of a machine, a computer system, or similar electronic computing device, that manipulates and transforms data represented as physical (e.g., electronic) quantities within the machine's registers and memories into other data similarly represented as physical quantities within the machine memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

For simplicity of explanation, the methods have been depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture (e.g., a computer readable storage medium) to facilitate transporting and transferring such methods to computing devices. The term article of manufacture, as used herein, is intended to encompass a computer program accessible from any computer-readable device or storage media.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

Reference throughout this disclosure to "one implementation," or "an implementation" means that a particular feature, structure, or characteristic described in connection with the implementation or implementation is included in at least one implementation. Thus, the appearances of the phrase "in one implementation," or "in an implementation" in various places throughout this specification are not necessarily all referring to the same implementation. Furthermore, the particular features, structures, or characteristics may be combined in any suitable manner in one or more implementations.

Implementations also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computing system bus.

The methods and systems described herein can be used in a wide variety of implementations, including as part of a mobile application ("app"), and can be part of photo or video-related software including a mobile operating system. Apps installed on the mobile device can access the systems and methods via one or more application programming interface (API).

The algorithms and displays presented herein are not inherently related to any particular computing system or other apparatus. Various general purpose systems may be used with programs in accordance with the teachings herein or it may prove convenient to construct more specialized apparatus to perform the required method steps. The required structure for a variety of these systems will be apparent from the description above. In addition, the present disclosure is not described with reference to any particular programming language. It will be appreciated that a variety of programming languages may be used to implement the teachings of the disclosure as described herein.

What is claimed is:

1. A computer-implemented method, comprising:

receiving, via a user interface presented on a mobile device, a request for a desired modification of an original media content item, the desired modification to be applied to the original media content item on another computing device;

prior to transmitting the request for the desired modification of the original media content item to the other computing device:

performing, by a processing device of the mobile device, a simplified version of the desired modification of the original media content item at substantially the same time as a receipt of the request for the desired modification via the user interface, wherein the desired modification includes more operations than the simplified version of the desired modification, wherein the operations of the desired modification use one or more reference media content items that are different from the original media content item and are not used for the simplified version of the desired modification, and wherein performing the simplified version of the desired modification of the original media content item involves less computing resources than performing the desired modification of the original media content item; and presenting, in the user interface on the mobile device, a preview of a modified media content item resulting from the simplified version of the desired modification; and transmitting, to the other computing device, the original media content item with the request for the desired modification to be applied to the original media content item.

2. The method of claim 1 further comprising:
receiving, via the user interface, a confirmation of the request for the desired modification of the original media content item.

3. The method of claim 1, wherein the other computing device is another mobile device.

4. The method of claim 1 further comprising:
receiving the media content item with the desired modification from the other computing device; and
displaying the media content item with the desired modification in the user interface.

5. The method of claim 1, wherein the desired modification of the media content item includes one or more filters that modify an audio or a visual presentation of the media content item.

6. The method of claim 5 wherein the one or more filters include an adjustment to a color, saturation, contrast, brightness, tint, focus, spatial property, stabilization, or exposure of the media content item.

7. The method of claim 5 wherein the one or more filters include an effect or enhancement, a framed border, a color overlay, a blur, a sepia effect, a lens flare, erasure of audio, or dubbing of audio.

8. The method of claim 1, wherein the other computing device is a stationary computing system.

9. A system for a mobile device, comprising:
a user interface of the mobile device;
a memory; and
a processing device coupled with user interface and the memory to:
  receive, via the user interface, a request for a desired modification of an original media content item, the desired modification to be applied to the original media content item on another computing device;
  prior to transmitting the request for the desired modification of the original media content item to the other computing device, perform a simplified version of the desired modification of the original media content item at substantially the same time as a receipt of the request for the desired modification via the user interface, wherein the desired modification includes more operations than the simplified version of the desired modification, wherein the operations of the desired modification use one or more reference media content items that are different from the original media content item and are not used for the simplified version of the desired modification, and wherein performing the simplified version of the desired modification of the original media content item involves less computing resources than performing the desired modification of the original media content item;
  present, in the user interface of the mobile device, a preview of a modified media content item resulting from the simplified version of the desired modification; and
  transmit, to the other computing device, the original media content item with the request for the desired modification to be applied to the original media content item.

10. The system of claim 9, the processing device further to:
receive, via the user interface, a confirmation of the request for the desired modification of the original media content item.

11. The system of claim 9, the processing device further to:
receive the media content item with the desired modification from the other computing device; and
display the media content item with the desired modification in the user interface.

12. The system of claim 9, wherein the desired modification of the media content item includes one or more filters that modify an audio or a visual presentation of the media content item.

13. The system of claim 12 wherein the one or more filters include an adjustment to a color, saturation, contrast, brightness, tint, focus, spatial property, stabilization, or exposure of the media content item.

14. The system of claim 12 wherein the one or more filters include an effect or enhancement, a framed border, a color overlay, a blur, a sepia effect, a lens flare erasure of audio, or dubbing of audio.

15. The system of claim 9, wherein the other computing device is a stationary computing system.

16. A non-transitory computer readable storage medium encoding instructions thereon that, in response to execution by a processing device, cause the processing device to perform operations comprising:
receiving, via a user interface presented on a mobile device, a request for a desired modification of an original media content item, the desired modification to be applied to the original media content item on another computing device;
prior to transmitting the request for the desired modification of the original media content item to the other computing device:
  performing a simplified version of the desired modification of the original media content item, wherein the desired modification includes more operations than the simplified version of the desired modification at substantially the same time as a receipt of the request for the desired modification via the user interface, wherein the operations of the desired modification use one or more reference media content items that are different from the original media content item and are not used for the simplified version of the desired modification, and wherein performing the simplified version of the desired modification of the original media content item involves less computing resources than performing the desired modification of the original media content item; and
  presenting, in the user interface on the mobile device, a preview of a modified media content item resulting from the simplified version of the desired modification; and
transmitting, to the other computing device, the original media content item with the request for the desired modification to be applied to the original media content item.

17. The non-transitory computer readable storage medium of claim 16, the processing device further to perform:
receiving, via the user interface, a confirmation of the request for the desired modification of the original media content item.

18. The non-transitory computer readable storage medium of claim 16 the processing device further to perform:
receiving the media content item with the desired modification from the other computing device; and
displaying the media content item with the desired modification in the user interface.

19. The non-transitory computer readable storage medium of claim 16, wherein the desired modification of the media content item includes one or more filters that modify an audio or a visual presentation of the media content item.

20. The non-transitory computer readable storage medium of claim 16, wherein the other computing device is a stationary computing system.

\* \* \* \* \*